United States Patent [19]

McCune, Jr.

[11] Patent Number: 5,053,982
[45] Date of Patent: Oct. 1, 1991

[54] VARIABLE MODULUS DIGITAL SYNTHESIZER

[75] Inventor: Earl W. McCune, Jr., Santa Clara, Calif.

[73] Assignee: Proxim, Inc., Mountain View, Calif.

[21] Appl. No.: 310,134

[22] Filed: Feb. 14, 1989

[51] Int. Cl.$^5$ .............................. G06F 1/02
[52] U.S. Cl. ..................................... 364/721
[58] Field of Search ............................. 364/718–721; 328/14–15

[56] References Cited

U.S. PATENT DOCUMENTS

| 3,735,269 | 5/1973 | Jackson | 328/14 |
| 4,360,788 | 11/1982 | Erps et al. | 328/15 X |
| 4,438,503 | 3/1984 | White et al. | 364/718 |
| 4,479,192 | 10/1984 | Yamagami | 364/719 |
| 4,602,219 | 7/1986 | Underhill et al. | 328/14 X |
| 4,746,880 | 5/1988 | McCune, Jr. | 332/16 R |
| 4,752,902 | 6/1988 | Goldberg | 364/721 |

Primary Examiner—Gary V. Harkcom
Assistant Examiner—Long T. Nguyen
Attorney, Agent, or Firm—Flehr, Hohbach, Test, Albritton & Herbert

[57] ABSTRACT

A synthesizer capable of generating a multiplicity of output frequency signals with 1 hertz resolution utilizing binary mathematics in a binary circuit. The apparatus includes providing to an accumulator a stable reference input signal having a frequency value of K, a defined value of $2^N$ where N is an integer, a rollover value R equal to $2^N$ minus the synthesizer modulus M and a desired output frequency signal having a value V selected from the range of integer values between 1 and K. The accumulator, at the rate of K, periodically increments the accumulator contents A by the value V, until the accumulated value exceeds $2^N - 1$. The accumulator's content A is then set at the next cycle of the reference input signal K to a value of $A - 2^N + R + V$. A convertor converts the values of A into an output signal. In the preferred embodiment, the accumulator includes digital circuitry having $2^N$ capacity and performs binary arithmetic to accomplish the accumulations.

15 Claims, 2 Drawing Sheets

| CLOCK CYCLE T | ACCUMULATOR VALUE A | $A > 2^N - 1$ | A RESET TO $(A - 2^N + V) + R$ |
|---|---|---|---|
| 0 | 0 | NO | — |
| 1 | 4,500,000 | NO | — |
| 2 | 9,000,000 | NO | — |
| 3 | 13,500,000 | NO | — |
| 4 | 18,000,000 | YES | 1,222,784 + 6,777,216 |
|   | 8,000,000 | NO | — |
| 5 | 12,500,000 | NO | — |
| 6 | 17,000,000 | YES | 222,784 + 6,777,216 |
|   | 7,000,000 | NO | — |
| 7 | 11,500,000 | NO | — |
| 8 | 16,000,000 | NO | — |

VARIABLE MODULUS DIGITAL SYNTHESIZER

The present invention relates generally to a synthesizer capable of generating a multiplicity of output frequency signals. More particularly, the invention relates to a method and an apparatus for synthesizing a multiplicity of output frequency signals with one-hertz resolution utilizing binary arithmetic in a binary circuit.

BACKGROUND OF THE INVENTION

Synthesizers generate a multiplicity of frequency output signals from a single input frequency clock-reference signal. The number of different output frequencies the synthesizer is capable of producing is referred to in the art as the synthesizer's accumulator modulus (M). The resolution of a synthesizer denotes the steps or difference in hertz between the output frequencies the synthesizer is capable of producing.

Two standards in the electronics industry influence synthesizer circuit design: first, the popularity, low cost and efficienc of digital electronics; and second, reference clock input signals typically have frequencies based on exponential variations of the decimal number 10 (i.g. $10^D = 1$ MHz, or 10 MHz where D=6 and 7 respectively). Together, these two factors anticipate the fact that current synthesizer devices include digital electronics that are designed to perform decimal mathematics.

Examples of decimal based frequency generators are found in Goldberg U.S. Pat. No. 4,752,902, and Jackson U.S. Pat. No. 3,735,269. To achieve one hertz resolution in these devices, it is required to set the accumulator modulus equal the input clock frequency. In other words, ($M = 10^D$) in these devices. Decimal based synthesizers having 1 hertz resolution are plagued with a number of problems. Namely, synthesizers having decimal moduli are larger, slower and have less resolution than an accumulator of equivalent bit count which performs binary arithmetic. In McCune Jr. U.S. Pat. No. 4,746,880, a binary based synthesizer is disclosed. However, it is not capable of achieving one Hertz resolution from an industry standard decimal number clock reference frequency.

Accordingly, there is a need for a hertz resolution synthesizer which performs binary arithmetic and operates on standard decimal number input clock frequencies.

SUMMARY OF THE INVENTION

Accordingly, it is a primary object of the present invention to provide a synthesizer capable of generating a multiplicity of output frequency signals with 1 hertz resolution utilizing binary mathematics in a binary circuit from a standard clock-reference input signal having a decimal number ($10^D$) frequency.

To achieve the foregoing and other objects in accordance with the purpose of the present invention, there is provided a method and an apparatus for synthesizing a selected output frequency signal from a stable reference frequency input signal. The apparatus and method include providing to an accumulator a stable reference input signal having a frequency value of K, a defined value of $2^N$ where N is an integer, a rollover value R equal to $2^N$ minus the synthesizer modulus M and a selected output frequency signal having a value V from the range of integer values between 1 and M. The accumulator, at the rate of K, periodically increments the accumulator contents A by the value V, until the accumulated value exceeds $2^N - 1$. The accumulator's content A is then reset to a value of $A - 2^N + R + V$. A converter converts the values of A into an output signal. In the preferred embodiment, the accumulator includes digital circuitry having $2^N$ capacity and performs binary arithmetic to accomplish the accumulations.

BRIEF DESCRIPTION OF THE DRAWINGS

Additional objects and features of the invention will be more readily apparent from the following detailed description and appended claims when taken in conjunction with the drawings, in which

DESCRIPTION OF THE PREFERRED EMBODIMENT

Figure 1:
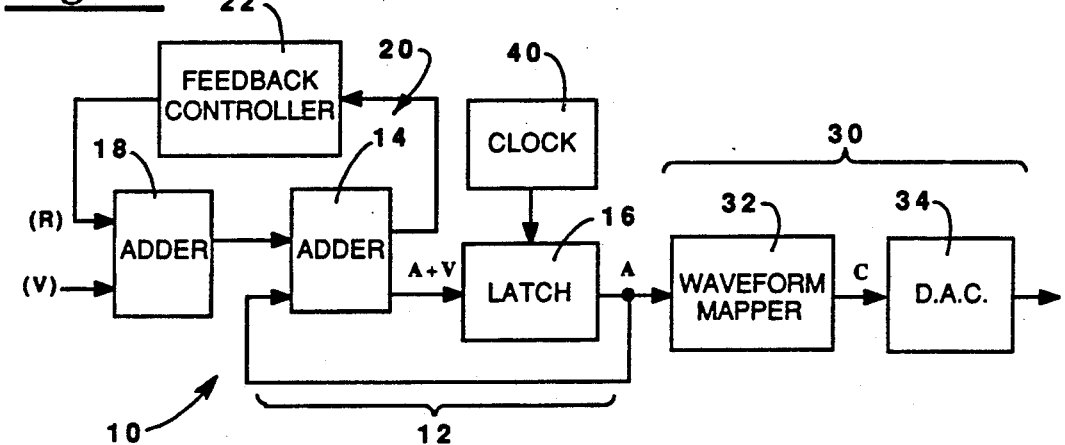
FIG. 1 is a block diagram of the synthesizer for generating an output signal at a desired frequency according to an embodiment of the present invention.

Referring to FIG. 1, a block diagram of the synthesizer according to an embodiment of the present invention is shown. The purpose of the synthesizer 10 is to generate a high precision output signal at a specified target frequency V. The synthesizer 10 is capable of generating (M) different target frequencies V from a single reference decimal number clock frequency K, where V falls between the range determined by 1 and K. The general technique employed by the synthesizer 10 is to accumulate a value of A using a binary adder between a lower and a upper boundary in a cyclical fashion. With each accumulation, the value of A is incremented by the value V, until the upper boundary is exceeded. To duplicate the cycle, the value of A is then set to the lower boundary, and the accumulation procedure is repeated. The timing of each cycle substantially equals the target value V. The cycle of synthesizer 10 is characterized by the following parameters:

(1), the boundary equals preselected value equal to $2^N - 1$ where N equals an integer, and (2), the lower boundary equals $A - 2^N + R + V$ where R is equal to $2^N - M$.

The synthesizer 10 includes an accumulator 12 comprising a first adder 14 electrically coupled to a latch 16. In turn, the output of the latch 16 is electrically coupled to one input of the first adder 14 to form a closed loop required for accumulation. The first adder 14 generates a rollover carry signal 20 when the adder's accumulated contents exceeds its maximum value. The synthesizer also includes a two-input second adder 18 adapted to receive a binary tuning input signal representing the value V at its first input. A feedback controller 22 is electrically coupled to receive the output rollover carry signal 20 from adder 14. The output of the feedback controller 22 is electrically coupled to the second input of the second adder 18. If the roll over output carry signal 20 from adder 14 is inactive (0), feedback controller 22 outputs the value 0, causing adder 18 to output the value $(V+0)=V$. When the carry signal is active (1), feedback controller 22 outputs the number R, causing adder 18 to output the value (V+R). The output of the adder 18 is electrically coupled to the input of the first adder 14.

As previously noted, the value V is indicative of the desired target output signal frequency. In the preferred embodiment, the tuning input signal is in the form of a hexadecimal binary word having a value of V. It would be obvious to those skilled in the art though to provide the tuning input signal in any numerical form, including, but not limited to binary coded decimal.

A converter 30, including a waveform mapper 32 and a digital to analog converter (DAC) 34 converts the accumulator output into an output signal having a frequency V. In the preferred embodiment, the first adder 14, latch 16, converter 30 and second adder 18 all comprise digital circuitry with $2^N$ bit capacity capable of performing binary arithmetic.

The latch 16 is driven by a stable input reference frequency generated by clock 40. Clock 40 generates the industry standard decimal number clock frequency signal K (e.g., $10^D$ equal to 1 MHz or 10 MHz where D equals 6 and 7 respectively). For one Hertz resolution in synthesizer 10, K defines the accumulator modulus (M) since M=(K/resolution). The value of M therefore defines a range of integer values from which the target value V must be selected, which is between 1 and M inclusive.

The accumulator 12 of the synthesizer 10 operates in two states, an incrementing state and a rollover state. During the incrementing state, the second adder 18 is adapted to provide to the first adder 14 the value V. The first adder 14 then periodically adds the previously accumulated value A and V together to increment the value A at the rate of the clock frequency K. In the rollover state, when the accumulated value of A exceeds the $2^N-1$, the value $A-2^N+R+V$ where R is equal to $2^N-M$. The setting of the accumulator to the new value A ensures that the target output frequency V is obtained.

Briefly describing the operation of the synthesizer 10, the first adder 14 increments the current value A stored in the latch 16 by the value V using binary arithmetic to add the two values. At the next clock pulse K, the newly incremented value of A is loaded into latch 16. With the next pulse of the reference clock signal K, the incrementation procedure is repeated and the value of A is again stored in latch 16.

This process is repeated until the value of A exceeds $2^N-1$, whereupon the accumulator value A is set. To set the accumulator value A, the first adder 14 transmits to the feedback controller 22 the rollover carry signal 20 when the value of A exceeds $2^N-1$. As will be understood by those familiar with binary adders, the remaining value in the adder 14 will equal $A-2^N$. Feedback controller 22 responds to this rollover carry signal by providing a signal indicative of a value R to the input of the second adder 18. In response thereto, the second adder 18 adds the values V and R together using binary arithmetic and provides the sum to the input of the first adder 14. The first adder 14 adds the (V+R) sum to the accumulation residual value $(A-2^N)$. Hence, the output of first adder equals $A-2^N+R+V$. With the next reference signal clock pulse, this value is loaded into latch 14 and becomes the reset accumulator value A. Thereafter, the synthesizer 10 returns to the incrementing state and the accumulation process is repeated. The converter 30 converts the values of A into an analog output signal.

Figure 2:
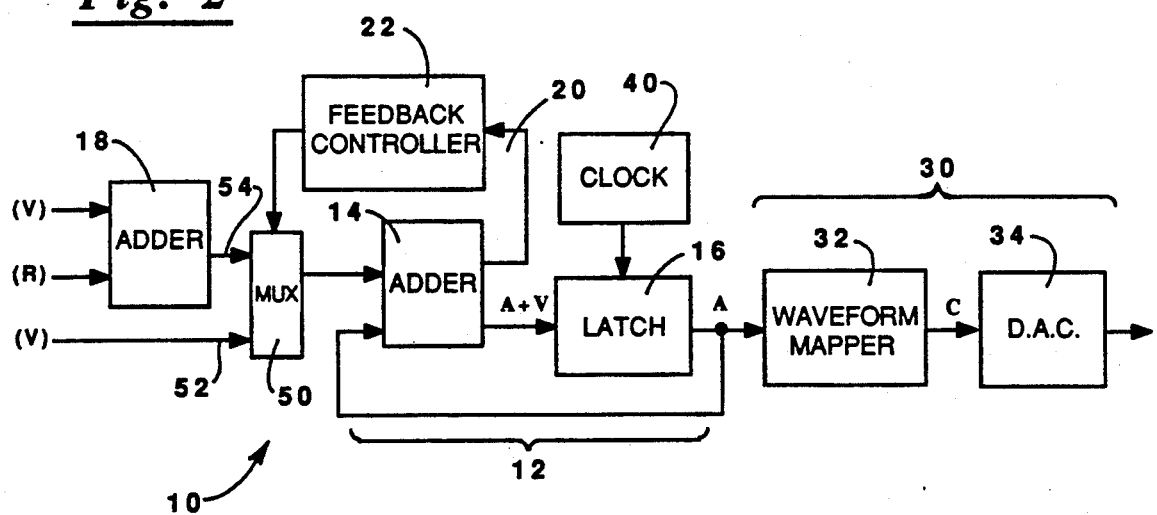
FIG. 2 is a block diagram of the synthesizer shown in FIG. 1 having an additional multiplexer according to an alternative embodiment of the present invention.

Referring now to FIG. 2, a block diagram of the synthesizer shown in FIG. 1 having an additional multiplexer (MUX) 50 according to an alternative embodiment of the present invention is shown. The embodiment shown in FIG. 2 offers a speed improvement in performing the addition (V+R) executed by the second adder 18. The addition of the MUX permits the values V and (V+R) to be fixed at the MUX inputs. The rollover carry signal 20 generated by the first adder is used to selectively change the MUX output to the first adder 14 to the required value for correct accumulator operation. Since changing the MUX state is much faster than performing the second adder's N-bit addition, the speed of the synthesizer 10 is greatly improved.

In a detailed description of FIG. 2, the two input MUX 50 is electrically coupled between the second adder 18 output and the first adder 14. The value V is present at the MUX's first input 52, and the output of second adder 18 equal to the value (V+R) is electrically coupled to the second input 54 of the MUX. The output of the MUX is electrically coupled to the input of the first adder 14 input.

During periods when the accumulated value A is less than $2^N-1$, the MUX provides its first input 52 value V to the first adder 14. To selectively control the MUX output to aid in the resetting of accumulator value A, the first adder generates the rollover carry signal 20 in response to an accumulated value A exceeding $2^N-1$. The rollover carry signal changes the MUX output state to provide its second input 54 to the first adder's 14 input. Hence, output of first adder 14 equals $A-2^N+R+V$. The operation of the accumulator 12 is identical to that as explained above in relation with the synthesizer shown in FIG. 1. With the next reference signal clock pulse, the first adder's 14 output value $A-2^N+R+V$ is loaded into latch 14 and the accumulation process is repeated. The converter 30 converts the values of A into an analog output signal.

Figures 3, 4:
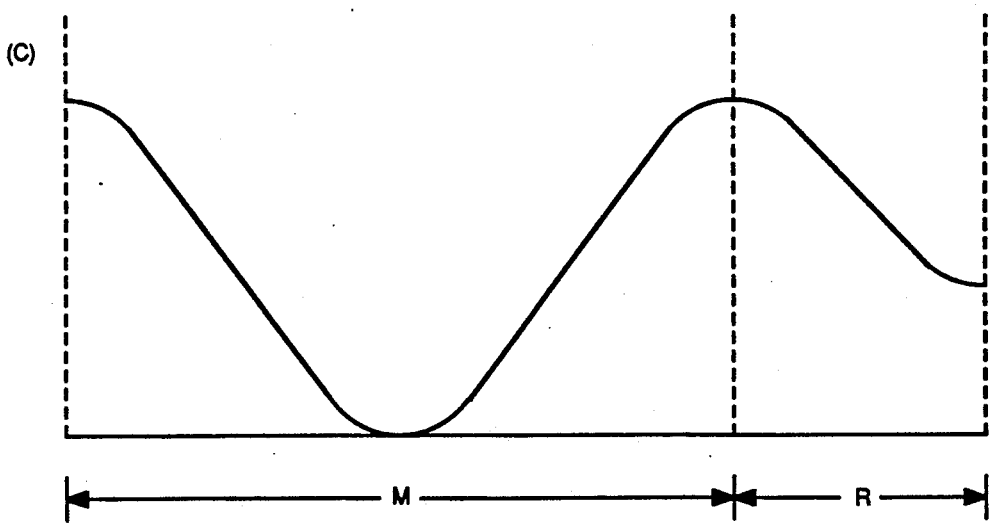
FIG. 3 is a table of actual accumulated values A produced by the synthesizer shown in either FIG. 1 or FIG. 2 during operation of the present invention.
FIG. 4 is a waveform map constructed by plotting the values A in the table of FIG. 3 according to the present invention.

To illustrate the operation and principle of the variable modulus accumulator of the present invention, an actual example is used. Referring now to FIG. 3, a table of actual accumulated values A produced by the synthesizers shown in FIG. 1 or FIG. 2 during operation is shown. In the example, assume the following parameters:

| | |
|---|---|
| N = 24 | The synthesizer components 14, 16, 18 and 50 are capable of existing in $2^{24}$ = 16,777,216 different states, |
| V = 4,500,000, | |
| K = 10,000,000, | |
| M = K, and | |
| R = $2^N$ - M = 6,777,216 | |

For the purpose of this discussion, the accumulator value A is initially set at zero. With each reference clock pulse K, the accumulator value A is incremented by the value of V equal to 4,500,000. On the fourth pulse, the incremented value of A is greater than $2^{24}$ and the capacity of the adder 14 is exceeded. As a result, only the residual value of $A-2^{24}$ is present at the output of adder 14. In response to the overflow, the first adder generates the carry over signal 20, which in turn yields the value (V+R) at the first adder's 14 input as described in both embodiments above. The output of the first adder is then equal to $A - 2^{24} + 4{,}500{,}000 + 6{,}277{,}216 = 8{,}000{,}000$. Hence, the accumulator value A is reset to this value at the next reference clock pulse. Note, for the first cycle, the cycle does not equal K/V clock cycles as shown for steady state-state output. This start up transient represents the synthesizer accumulator modulus being changed from the natural value of $2^N$ to the operating value of M.

This accumulation step is continuously repeated, as indicated by the remaining values A in the table of FIG. 3. After the first cycle, the occurrence of the value A exceeding $2^{24}$ occurs with a frequency equal the target value of 4,500,000 times per second.

Referring now to FIG. 4, a construction of a waveform map constructed from the values A in the table of FIG. 3 is shown. To construct the map, the waveform mapper 32 accepts the values of A from the accumulator 12 and in response thereto provides a digital number (C) for each value of A. The value of (C) is plotted along the vertical axis of the map at each clock pulse 18 having a frequency K. The DAC 34 converts the values of (C) into an analog output. Since the accumulator 12 is operating with a modulus M, the waveform map presents a complete cycle of the desired output waveform in M locations. This waveform map continues the waveform definition beyond the initial M locations, to completely fill all the map locations. The result is a waveform map containing more than one complete waveform cycle.

Specifically, a waveform map with a binary number of locations defining a cosine output waveform is shown in FIG. 4. The full cosine is implemented over the initial M map locations, and continues over the remaining R locations. Since the carry output signal from the accumulator 12 occurs when the accumulator value A exceeds $2^N - 1$, this will occur at a waveform map location at the end of the residual waveform extension. The additional R states jumped by the accumulator returns the waveform map to a location near R states from the beginning, leaving the desired M states until the end when the carry output reoccurs. This cycle repeats continuously.

The synthesizer 10 can be modified to compensate for any clock cycle delays required for time alignment of adder input bits. For example, the inclusion of a time alignment latch between the second adder 18 and the first adder 14 causes a one clock cycle delay for the second adder 18 output to arrive at the first adder 14 input. Accordingly, the mapper 32 requires modification to the values of C to provide waveform shape continuity.

This variable modulus technique solves a fundamental limitation of numeric synthesizers, namely, that the clock frequency, synthesizer output resolution and the type of arithmetic performed by the synthesizer (i.g., binary, binary coded decimal, or decimal) have not previously been independent. In other words, given any two of these parameters, such as clock frequency and type of arithmetic, the third, synthesizer output resolution in this example, is fixed. This fixed parameter may be at an undesirable value, which heretofore as been accepted.

The variable modulus technique of the present invention allows the synthesizer construction to be continuously changeable to meet requirements set by the available clock frequencies and required synthesizer output resolution. The method is inherently independent of the circuitry method used, so the most efficient binary method is t¹e common preferred choice.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Apparatus for synthesizing a selected output frequency signal from a stable reference frequency input signal, comprising:
   means for providing a stable reference input signal having a frequency K;
   means for providing a value V indicative of a target output signal frequency, said value V being in the range of integer values between 1 and K;
   means for defining a synthesizer modulus M and a rollover value R, where R equals $2^N$ minus M and N is a positive integer;
   an accumulator responsive to said reference input signal for periodically, at the rate of said stable reference input signal, incrementing an accumulated value A by said value V until the accumulated value A exceeds $2^N - 1$;
   said accumulator comprising a first adder electrically coupled to a latch, said latch periodically, at the rate of said reference input signal, storing the accumulated value A, and said first adder adding said value V to the accumulated value A stored in said latch;
   reset means for setting the accumulated value A in said accumulator means to a value $A - 2^N + R + V$ when the accumulated value A exceeds $2^N - 1$; and
   means for delivering an output signal corresponding to the accumulated value A.

2. The apparatus of claim 1, wherein said first adder generates a carry over signal indicative of the rollover value R when the accumulator value A exceeds $2^N - 1$.

3. The apparatus of claim 1, wherein said value V indicative of said target output signal frequency comprises a binary word indicative of said target value.

4. The apparatus of claim 3, wherein said reset means comprises a second adder which receives said binary word indicative of said target value V and said rollover carry signal as inputs and adds said binary word and said rollover carry signal together to provide an output sum when the accumulator value exceeds $2^N - 1$.

5. The apparatus of claim 4, wherein the output sum of said second adder is provided to an input of said first adder, whereby the accumulator value is reset to $A - 2^N + R + V$ when the accumulated value A exceeds $2^N - 1$.

6. The apparatus of claim 3 wherein said reset means comprises a second adder which adds the values V and R together to provide a value $V + R$, and a multiplexer which receives said value V at a first input and the value $V + R$ at a second input.

7. The apparatus of claim 6, wherein said multiplexer is electrically coupled to receive said carry over signal generated by said first adder and to provide its second input equal to $(V + R)$ to an input of said first adder in response to said carry over signal, whereupon the accumulator value is reset to $A - 2^N + R + V$.

8. The apparatus of claim 1, wherein said accumulator performs binary arithmetic to accomplish the incrementing of the accumulated value A.

9. Apparatus for synthesizing a selected output frequency signal from a stable reference frequency input signal, comprising:
  means for providing a stable reference input signal having a frequency K;
  means for providing a value V indicative of a target output signal frequency, said value V being in the range of integer values between 1 and K;
  means for defining a synthesizer modulus M and a rollover value R, where R equals $2^N$ minus M and N is a positive integer;
  an accumulator responsive to said reference input signal for periodically, at the rate of said stable reference input signal, incrementing an accumulated value A by said value V until the accumulated value A exceeds $2^N - 1$;
  reset means for setting the accumulated value A in said accumulator means to a value $A - 2^N + R + V$ when the accumulated value A exceeds $2^N - 1$; and
  means for delivering an analog output signal corresponding to the accumulated value A, said means comprising means for converting successive ones of the accumulated value A into corresponding numerical values C, a mapper for mapping said numerical values C over M locations and continuing over R locations to complete said map of $2^N$ locations, and a digital to analog converter for converting said values C to analog form.

10. Apparatus for synthesizing an output signal of decimal based frequency and resolution from a reference signal of predetermined decimal based frequency, comprising: a binary accumulator having a capacity of $2^N$ and comprising an adder and a storage device connected in a loop with the output of the adder being connected to the input of the storage device and the output of the storage device being connected to a first input of the adder, means for applying a signal to a second input of the adder to periodically increment a binary number in the accumulator by an amount equal to the desired frequency of the output signal until the number in the accumulator reaches the capacity of the accumulator and a carry occurs, means for incrementing the number remaining in the accumulator when the carry occurs by the difference between the capacity of the accumulator and a binary number equal to the frequency of the reference signal divided by the resolution of the output signal, and means for delivering an analog output signal corresponding to the number in the accumulator.

11. Apparatus for synthesizing an output signal of desired frequency and resolution from a reference signal of predetermined frequency, comprising: an accumulator having an adder and a latch connected in a loop with the output of the adder being connected to the input of the latch and the output of the latch being connected to a first input of the adder, means for periodically applying a signal corresponding to the desired frequency of the output signal to a second input of the adder to increment a number in the accumulator by an amount equal to the desired frequency until the number in the accumulator reaches the capacity of the accumulator and a carry occurs, means for incrementing the number remaining in the accumulator when the carry occurs by the difference between the capacity of the accumulator and a number equal to the frequency of the reference signal divided by the resolution of the output signal, and means for delivering an electrical output signal corresponding to the number in the accumulator.

12. Apparatus for synthesizing an output signal of desired frequency and resolution from a reference signal of predetermined frequency, comprising: an accumulator means for periodically incrementing a number in the accumulator by an amount equal to the desired frequency of the output signal until the number in the accumulator reaches the capacity of the accumulator and a carry occurs, an adder, means for applying a signal corresponding to the desired output frequency to one input of the adder, means for applying a signal corresponding to the difference between the capacity of the accumulator and a number equal to the frequency of the reference signal divided by the resolution of the output signal to second input of the adder, means for applying the output of the adder to an input of the accumulator to increment the number remaining in the accumulator when the carry occurs by the difference between the capacity of the accumulator and a number equal to the frequency of the reference signal divided by the resolution of the output signal, and means for delivering an electrical output signal corresponding to the number in the accumulator.

13. Apparatus for synthesizing an output signal of desired frequency and resolution from a reference signal of predetermined frequency, comprising: an accumulator, means for periodically incrementing a number in the accumulator by an amount equal to the desired frequency of the output signal until the number in the accumulator reaches the capacity of the accumulator and a carry occurs, an adder, means for applying a signal corresponding to the desired output frequency to one input of the adder, means for applying a signal corresponding to the difference between the capacity of the accumulator and a number equal to the frequency of the reference signal divided by the resolution of the output signal to second input of the adder, a multiplexer, means connecting the output of the adder to one input of the multiplexer, means for applying a signal corresponding to the desired output frequency to a second input of the multiplexer, means for applying the output of the multiplexer to an input of the accumulator to increment the number remaining in the accumulator when the carry occurs by the difference between the capacity of the accumulator and a number equal to the frequency of the reference signal divided by the resolution of the output signal, and means for delivering an electrical output signal corresponding to the number in the accumulator.

14. Apparatus for synthesizing an output signal of desired frequency and resolution from a reference signal of predetermined frequency, comprising: an accumulator, means for periodically incrementing a number in the accumulator by an amount equal to the desired frequency of the output signal until the number in the accumulator reaches the capacity of the accumulator and a carry occurs, means for incrementing the number remaining in the accumulator when the carry occurs by the difference between the capacity of the accumulator and a number equal to the frequency of the reference signal divided by the resolution of the output signal, a waveform mapper for providing amplitude data at a point on a predetermined output waveform corresponding to the number in the accumulator, and a digital to analog converter responsive to the amplitude data for providing an analog output signal of the predetermined waveform and the desired output frequency.

15. The apparatus of claim 14 wherein the waveform mapper provides amplitude data for a sinusoidal waveform.

* * * * *